United States Patent [19]

Sepso

[11] 4,090,286
[45] May 23, 1978

[54] FLUID OPERATED DIAPHRAGM ASSEMBLY AND METHOD OF MAKING THE SAME

[75] Inventor: Roger P. Sepso, Stratford, Conn.

[73] Assignee: Robertshaw Controls Company, Richmond, Va.

[21] Appl. No.: 734,348

[22] Filed: Oct. 20, 1976

Related U.S. Application Data

[60] Division of Ser. No. 568,425, Apr. 16, 1975, abandoned, which is a continuation of Ser. No. 428,875, Dec. 27, 1973, abandoned.

[51] Int. Cl.$^2$ ............................................... B23P 19/04
[52] U.S. Cl. ................................... 29/454; 113/116 B
[58] Field of Search ...... 29/454; 113/116 B, 116 GG; 267/122, 123; 92/34, 42, 50, 49; 73/410; 200/83 R, 83 B

[56] References Cited

U.S. PATENT DOCUMENTS

| | | | |
|---|---|---|---|
| 2,109,145 | 2/1938 | Farmer et al. | 200/83 |
| 2,529,785 | 11/1950 | Persons | 200/83 |
| 3,390,579 | 7/1968 | Glattenberg et al. | 73/410 |
| 3,442,180 | 5/1969 | Babic | 73/407 |
| 3,805,368 | 4/1974 | Eberhard et al. | 29/454 |

FOREIGN PATENT DOCUMENTS

| 735,918 | 6/1943 | Germany | 73/410 |
|---|---|---|---|

*Primary Examiner*—Lowell A. Larson
*Attorney, Agent, or Firm*—Candor, Candor & Tassone

[57] ABSTRACT

A fluid operated diaphragm assembly having a pair of diaphragm members each provided with annular inner and outer peripheral portions separated from each other by an annular fluted portion. A ring member is disposed between the outer peripheral portions of the diaphragm members and is secured respectively thereto whereby a chamber is defined between the diaphragm members inboard of the ring member. The diaphragm members each has a natural tendency to maintain its respective inner and outer peripheral portions coplanar with each other whereby the inner peripheral portions are normally spaced from each other a distance that is approximately the same dimension as the thickness of the ring member.

1 Claim, 10 Drawing Figures

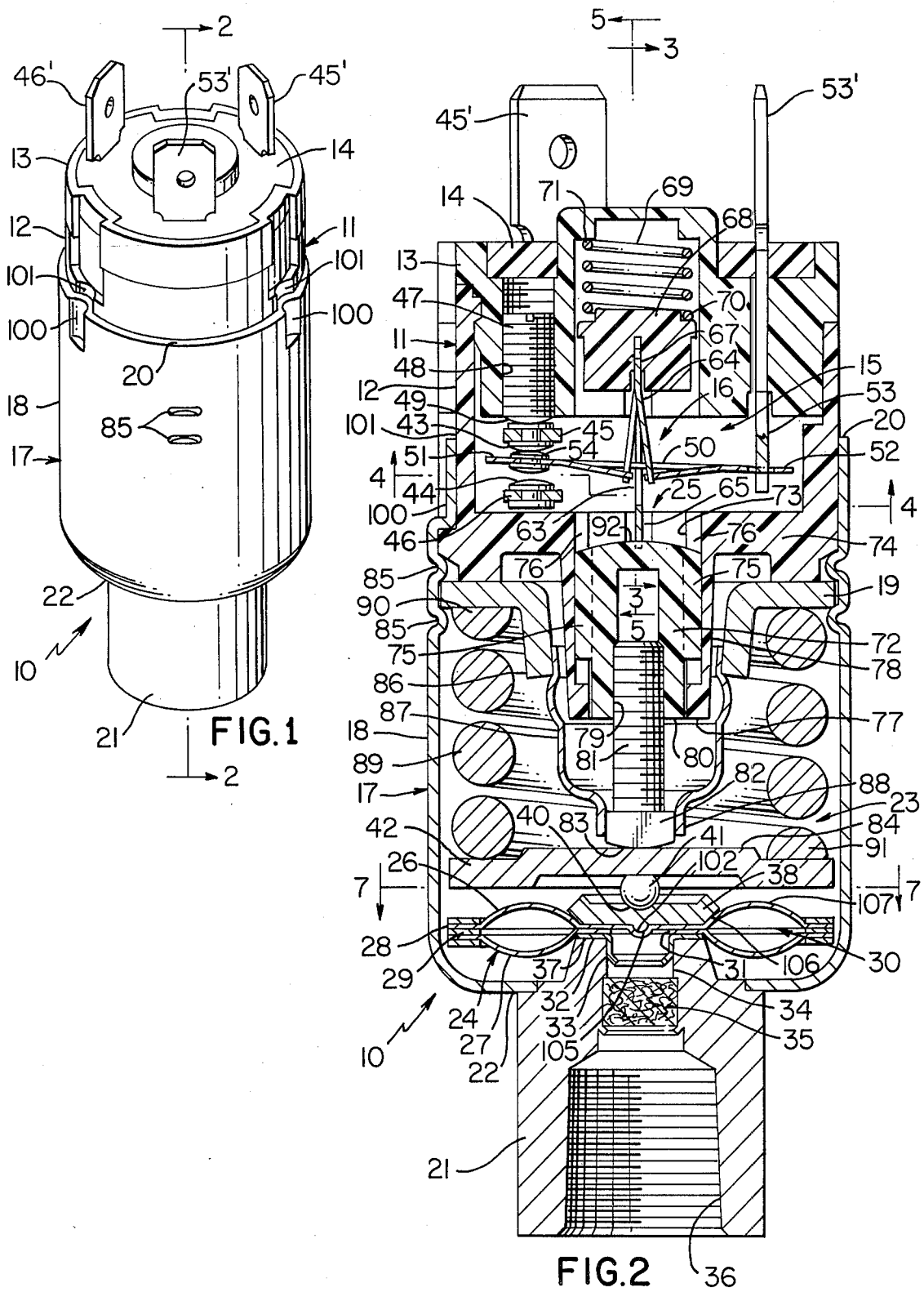

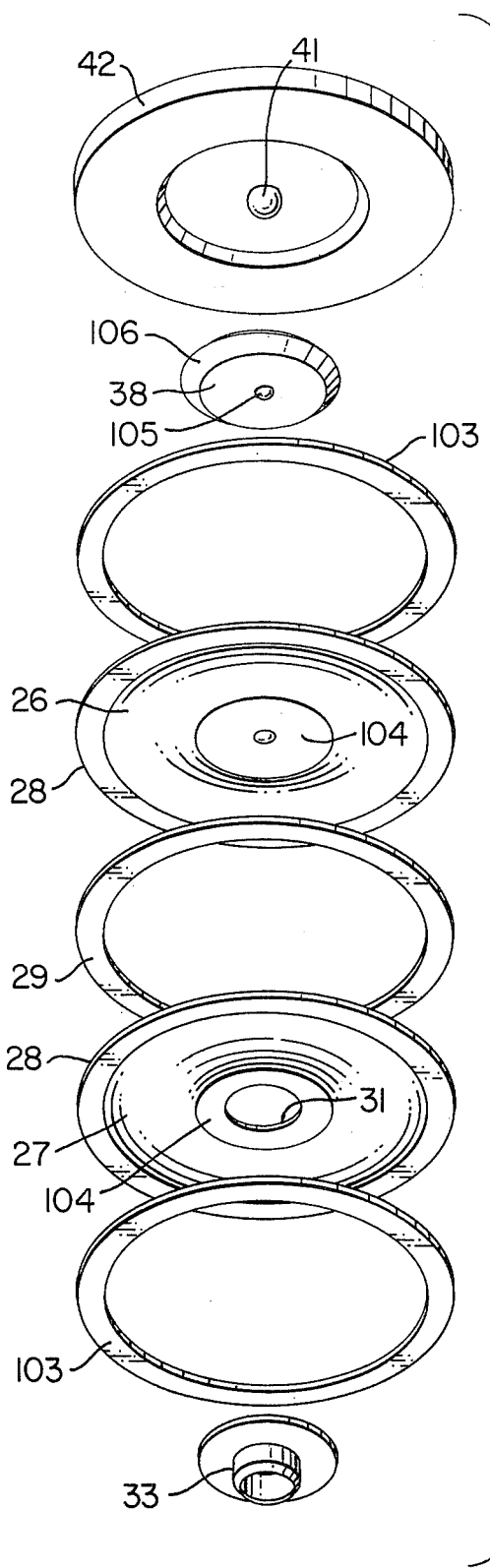
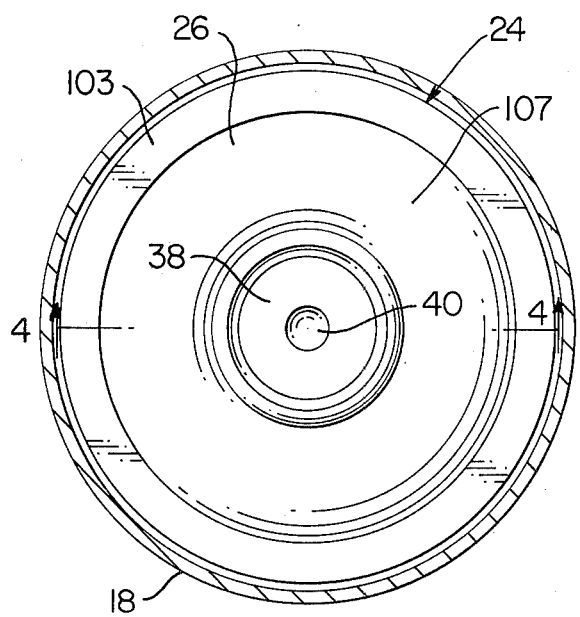
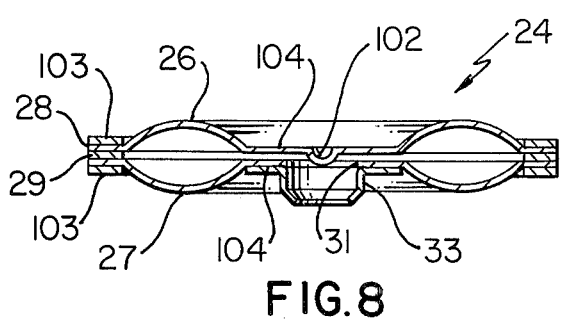
FIG. 6
FIG. 7
FIG. 8

1

FLUID OPERATED DIAPHRAGM ASSEMBLY AND METHOD OF MAKING THE SAME

This is a division, of application Ser. No. 568,425, filed Apr. 16, 1975, and now abandoned, which was a continuation of Ser. No. 4,28,875, filed Dec. 27, 1973, and now abandoned.

This invention relates to an improved fluid operated diaphragm assembly as well as to a method for making such a diaphragm assembly or the like.

It is well known that fluid operated electrical switch constructions have been provided wherein each comprises a housing means containing an electrical switch and a fluid operated power element operatively interconnected to the switch by motion transmitting means so that movement of the power element upon a change of fluid pressure therein will be transmitted by the motion transmitting means to the switch to operate the same.

It is a feature of this invention to provide an improved fluid operated diaphragm assembly that can be utilized as the power element of such a fluid operated electrical switch construction or the like.

Another feature of this invention is to provide a method of making such a fluid operated diaphragm assembly or the like.

In particular, one embodiment of this invention provides a fluid operated diaphragm assembly having a pair of diaphragm members each provided with annular inner and outer peripheral portions separated from each other by an annular fluted portion. A washer-like ring member is disposed between the outer peripheral portions of the diaphragm members and is secured respectively thereto whereby a chamber is defined between the diaphragm members inboard of the ring member. The diaphragm members each has a natural tendency to maintain its respective inner and outer peripheral portions coplanar with each other whereby the inner peripheral portions are normally spaced from each other a distance that is approximately the thickness of the ring member.

Accordingly, it is an objective of this invention to provide an improved fluid operated diaphragm assembly having one or more of the novel features set forth above or hereinafter shown or described.

Another object of this invention is to provide an improved method for making such a diaphragm assembly or the like, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a perspective view of an electrical switch construction utilizing the diaphragm assembly of this invention.

FIG. 2 is an enlarged, cross-sectional view taken on line 2—2 of FIG. 1.

FIG. 5 is an exploded perspective view of the diaphragm assembly of the switch construction of FIG. 2.

FIG. 7 is a cross-sectional view taken on line 7—7 of FIG. 2.

FIG. 8 is a cross-sectional view taken on line 8—8 of FIG. 7 and illustrates just the diaphragm assembly of this invention in its relaxed state.

Figure 2A:
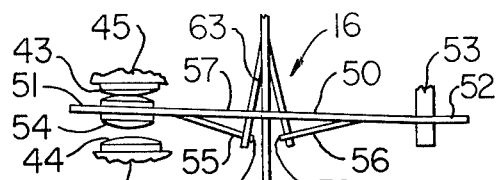
FIG. 2A is a schematic view of the electrical switch of the switch construction of FIG. 2.

While the various features of this invention are hereinafter described and illustrated as being particularly adapted to provide a fluid operated diaphragm assembly for an electrical switch construction, it is to be understood that the various features of this invention can be utilized singly or in any combination thereof to provide a diaphragm assembly for other control structures as desired.

Therefore, this invention is not to be limited to only the embodiment illustrated in the drawings, because the drawings are merely utilized to illustrate one of the wide variety of uses of this invention.

Referring now to FIGS. 1 and 2, a fluid operated electrical switch construction is generally indicated by the reference numeral 10 and comprises a first housing means generally indicated by the reference numeral 11 and formed from a plurality of housing parts 12 and 13 suitably secured together and sealed by a suitable potting compound 14 to define a chamber 15 therein that contains an electrical switch that is generally indicated by the reference numeral 16 and hereinafter described.

The fluid operated electrical switch construction 10 also includes a second housing that is generally indicated by the reference numeral 17 and comprises a cup-shaped casing 18 cooperating with an annular spring adjusting ring 19 adjacent its open end 20 and with a fitting 21 at its closed end 22 to define a chamber 23 therein that contains an expandable and contractible fluid operated power element of this invention that is generally indicated by the reference numeral 24 and hereinafter described.

The housing means 11 and 17 are secured together in an adjusted relationship as hereinafter described so that a motion transmitting arrangement or means that is generally indicated by the reference numeral 25 extends between the two housings 11 and 17 and operatively interconnects the power element 24 to the electrical switch 16 to operate the same in a manner hereinafter described.

The power element 24 of this invention comprises a pair of fluted diaphragm members 26 and 27 formed of metallic material and being suitably secured together at their outer annular flat peripheries 28 by an interposed annular washer-like member 29 so that a chamber 30 is formed in the element 24 inboard of the washer-like member 29.

The lower diaphragm member 27 has an opening 31 passing centrally through the flat inner periphery thereof and around which is secured an eyelet-like member 32 that has a tubular portion 33 thereof adapted to be disposed in a stepped bore 34 passing through the fitting 21 so as to fluidly interconnect the chamber 30 of the power element 24 to the stepped bore 34 of the fitting 21. The bore 34 of the fitting 21 has a suitable filter 35 disposed therein and is internally threaded at 36 to interconnect to a fluid pressure generating means (not shown) for a purpose hereinafter described to control the expansion and contraction of the power element 24 whereby the upper diaphragm member 26 is adapted to move upwardly and downwardly relative to a shoulder 37 of the fitting 21 against which the lower diaphragm member 27 is positioned by the eyelet 32 when the eyelet 32 is fully received in the stepped bore 34 as illustrated in FIG. 2.

A diaphragm button 38 is carried by the inner central peripheral portion 39 of the upper diaphragm member 26 and has a central concave recess 40 formed therein for receiving a ball 41 carried by a plate member 42 and forming part of the motion transmitting means 25 that is hereinafter described.

The method of this invention for making the power element or diaphragm assembly 24 for use in the previously described electrical switch construction 10 or other control device will now be described.

The diaphragm members 26 and 27 can be formed of like parts with like configurations except that the upper diaphragm member 26 has a concave recess 102 formed in the central part thereof whereas the lower diaphragm member 27 has the central opening 31 formed therethrough.

In one embodiment of this invention, the diaphragm members were approximately 0.900 of an inch in diameter and were formed from approximately 0.002 of an inch thick AM 350 stainless steel.

The eyelet 33 is first welded by projection welding to the lower diaphragm member 27.

Thereafter, this sub-assembly of the diaphragm member 27 and eyelet 33 is assembled with the upper diaphragm member 26 with the annular ring member 29 disposed between the outer peripheral portions 28 thereof and a pair of like ring members 103 are disposed outboard of the diaphragm members 26 and 27 against the outer peripheral portions 28 thereof. Thereafter, the sandwich of the diaphragm members 26 and 27 and ring members 103 and 29 are heliarc welded together whereby it can readily be seen in FIG. 8 that the outer peripheral portion 28 of each diaphragm member 26 or 27 is normally disposed coplanar with the substantially flat annular inner peripheral portion 104 thereof whereby the inner peripheral portions 104 of the diaphragm members are normally spaced from each other approximately the same distance as the thickness of the inner ring member 29 as it has been found that the inner peripheral portions 104 are spaced apart a little further than the actual thickness of the chill ring 29 due to the heat treating of the diaphragm members.

When forming the diaphragm members 26 and 27 of the aforementioned stainless steel material, it has been found that ring members 29 and 103 can be formed of approximately 0.015 of an inch thick stainless steel ASTM A-167 type 302 annealed material.

It has been found that when utilizing such a completed diaphragm assembly 24 of this invention, tests have proved that a minimum of failures occurred only after approximately 250,000 cycles with some samples reaching 1,000,000 cycles without failure.

The diaphragm button 38 is provided with a rounded extension 105 projecting centrally therefrom and the same is readily received in the locating recess 102 formed in the upper diaphragm member 26 as illustrated in FIG. 2.

The diaphragm button 38 is also provided with an outer peripheral chamfer 106 which readily permits the diaphragm button 38 to mate with the annular flute 107 of the upper diaphragm member 26 as fully illustrated in FIG. 2 so that the plate member 42 can be substantially universally mounted when the ball 41 thereof is received in the recess 40 of the diaphragm button 38 as hereinafter described.

The electrical switch 16 includes a pair of fixed contacts 43 and 44 disposed in spaced apart relation relative to each other and being respectively carried by terminal arms 45 and 46 fixed to the housing means 11, the terminal arm 45 having a natural bias toward the housing part 13 and being movable away from the same by a self-tapping or thread making threaded calibration adjustment member 47 being threadedly disposed in a bore 48 formed through the housing part 13 so that the lower end 49 of the adjustment member 47 can bear against the terminal part 45 to move the same toward the terminal part 46 as the threaded member 47 is threaded downwardly in FIG. 2 to permit the terminal part 45 to move upwardly relatively to the terminal part 46 as the threaded member 47 is threaded upwardly in the bore 48 for a purpose hereinafter described.

The electrical switch 16 includes a snap switch blade 50 that has opposed ends 51 and 52 and is formed of conductive material, the end 52 being fixed to a third terminal arm 53 carried by the housing means 11 while the end 51 of the blade 50 is movable relative to the housing means 11 and carries contact means 54 thereon for respectively cooperating with the fixed contact means 43 and 44 in a manner hereinafter described.

Figure 3:
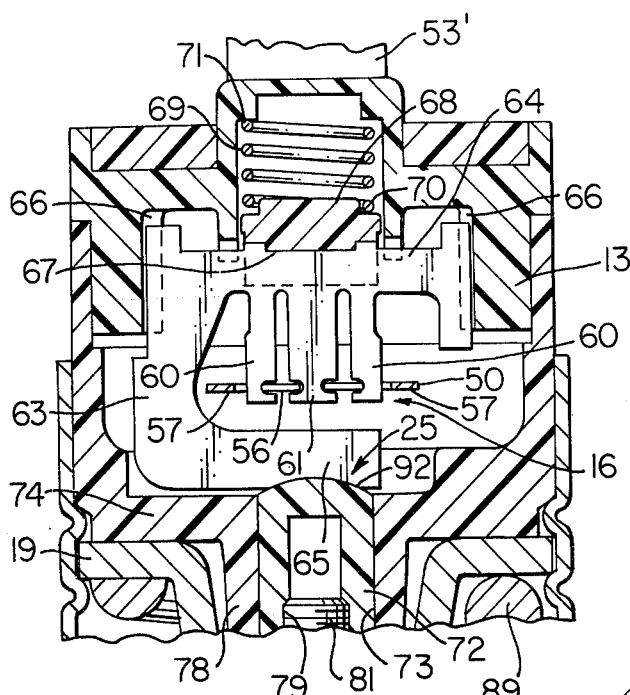
FIG. 3 is a fragmentary, cross-sectional view taken on line 3—3 of FIG. 2.
Figure 4:
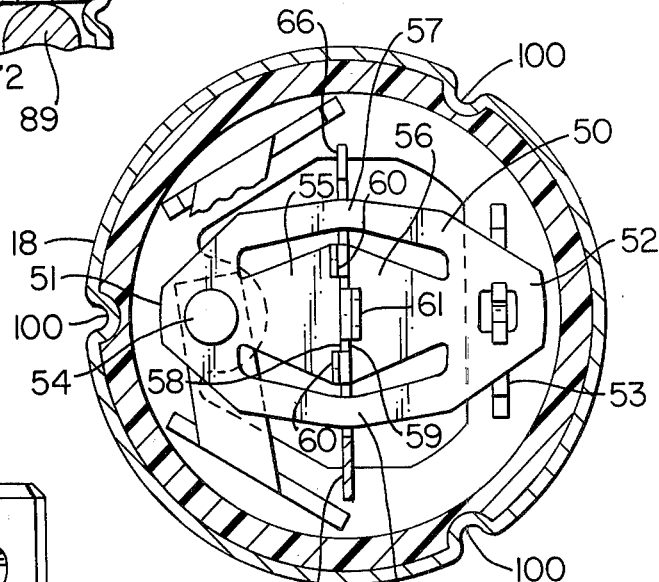
FIG. 4 is a cross-sectional view taken on line 4—4 of FIG. 2.
Figure 5:
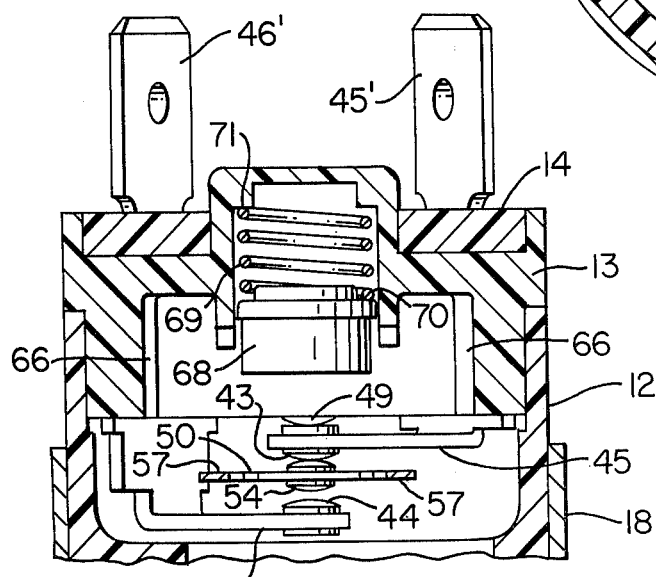
FIG. 5 is a fragmentary, cross-sectional view taken on line 5—5 of FIG. 2.

As illustrated in FIGS. 3 and 4, the switch blade 50 has a pair of tongues 55 and 56 carved therefrom and respectively extending from the opposed ends 51 and 52 of the blade 50 and being disposed inboard of a pair of side tension members 57 of the blade 50.

The tongues 55 and 56 are respectively interconnected at their inner ends 58 and 59 to leg means 60 and 61 of a C-shaped actuator or fork 63 having opposed ends 64 and 65 disposed in aligned relation and interconnected together by an arcuate portion as illustrated in FIG. 3 whereby the legs 60 and 61 extend from the end 64 of the actuator 63 to interconnect the end 64 of the actuator 63 to the tongues 55 and 56 of the snap blade 50.

The end 64 of the C-shaped actuator 63 is disposed in guiding slot means 66 of the housing part 13 and is also received in a slot 67 of a spring retainer 68 being urged downwardly against the end 64 of the actuator 63 in FIG. 2 by a compression spring 69 having one end 70 bearing against the spring retainer 68 and the other end 71 thereof bearing against the housing part 13 whereby the force of the spring 69 tends to move the actuator 63 downwardly and cause the tongues 55 and 56 of the snap blade 50 to pass or toggle over center of the tension members 57 to the position illustrated schematically in FIG. 2A so that the end 51 of the blade 50 is snapped upwardly and have its contact 54 held in urging contact with the upper fixed contact 43 to complete a circuit from the terminal arm 53 carrying the end 52 of the blade 50 to the terminal arm 45 through the conductive switch blade 50.

Figure 2B:
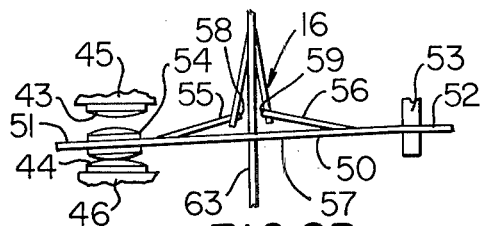
FIG. 2B is a view similar to FIG. 2A and illustrates the electrical switch in its other operating position.

When the actuator 63 is moved upwardly from the position illustrated in FIG. 2A to the position illustrated schematically in FIG. 2B so as to cause the tongues 55 and 56 of the blade 50 to move over center above the tension members 57, the blade 50 snaps the end 51 downwardly to hold the contact 54 thereof into electrical contact with the lower fixed contact 44 so that the electrical circuit is now completed from the terminal arm 53 to the terminal arm 46 through the conductive blade 50.

The details of the electrical switch 16 and the method of making the same are disclosed and claimed in another concurrently filed patent application presently designated as Robertshaw Controls Company Docket No. 2439-ER whereby reference can be made to such copending patent application if further details of the electrical switch 16 and method of making the same are desired.

The motion transmitting means 25 includes an insulated member 72 disposed in sliding relation in an opening 73 passing through an end wall 74 of the housing part 12 of the housing means 11 and has guides 75 thereon received in guide slots 76 in the housing part 12 which guide sliding axial movement of the part 72 relative to the housing means 11 while preventing the same from rotating relative thereto and from falling out of the opening 73 as the guide slots 76 terminate short of the lower end 77 of a tubular part 78 of the end wall 74 that has the opening 73 passing therethrough.

The sliding part 72 has a bore 79 interrupting the lower end 80 thereof and threadedly receives a self-tapping or thread making externally threaded screw member 81 having an enlarged rectangularly shaped head 82 at the lower end thereof and provided with a convex lower surface 83 that is adapted to bear against the flat upper surface 84 of the plate member 42.

The adjusting ring 19 of the housing 17 is held in position in the casing 18 by a suitable inward staking 85 of the casing 18 above and below the same as illustrated in FIGS. 1 and 2 and has an inner frustoconical portion 86 telescopically disposed about the tubular part 78 of the upper housing means 11 and carrying a tubular member 87 that is forced against the portion 86 of ring 19 to prevent rotation therebetween and which terminates with a rectangular portion 88 at the lower end thereof to receive the rectangular head 82 of the threaded member 81 and thereby prevent rotation thereof relative to member 87 while permitting axial movement of the head 82 relative thereto for a purpose hereinafter described.

A range spring 89 is disposed in the chamber 23 of the lower housing means 17 and has one end 90 bearing against the adjustment ring 19 and the other end 91 bearing against the plate member 42 to tend to urge the plate member 42 downwardly and, thus, urge the movable diaphragm member 26 downwardly against the fixed diaphragm member 27 in opposition to the force of any fluid pressure in the chamber 30 of the power element 24 whereby a certain pressure is required in the chamber 30 to cause the movable wall 26 to move upwardly away from the fixed wall 27 and thereby move the motion transmitting means 25 upwardly in opposition to the force of the range spring 89, as well as the force of the switch spring 69 as will be apparent hereinafter.

Because the plate member 42 has the ball 41 on the lower side thereof and the convex end surface 83 of the screw head 82 contacts the upper flat side thereof, the plate member 42 is, in effect, universally mounted between the diaphragm button 38 and the adjustment screw 81 to compensate for any misalignment of the motion transmitting arrangement 25 as well as uneven force of the range spring 89 as the plate member 42 can float in a universal manner.

The insulated part 72 of the motion transmitting means 25 has an upper convex surface 92 bearing against the lower end 65 of the C-shaped actuator 63 whereby the switch blade 50 is adapted to be actuated by the motion transmitting means 25 in a manner now to be described.

As long as the motion transmitting means 25 is in the position illustrated in FIGS. 2 and 2A, an electrical circuit is provided between the protruding terminal portions 53' and 45' of the respective terminal arms 53 and 45 as the switch blade 50 is maintained with its contact means 54 in contact with the upper fixed contact 43 as illustrated.

However, as fluid pressure builds up in the chamber 30 of the power element 24, such pressure differential across the movable wall 26 of the power element 24 continues to increase and when the same overcomes the force of the range spring 89, as well as the additional force of the compression spring 69 of the switch 16, the movable wall 26 moves upwardly and, through the contact button 38, ball 41, plate member 42, threaded member 81 and insulated member 72, acts against the lower end 65 of the C-shaped actuator 63 to move the same upwardly from the position illustrated in FIG. 2 until the tongues 55 and 56 snap over center and cause the end 51 of the blade 50 to snap downwardly from the position illustrated in FIG. 2A to the position illustrated in FIG. 2B and place the electrical contact 54 into contact with the lower contact 44. Thus, the electrical circuit is now created between the protruding terminal parts 53' and 46' of the respective terminal arms 53 and 46. This condition of the switch construction 10 will continue to exist as illustrated in FIG. 2B until the fluid pressure directed to the chamber 30 of the power element decreases to a condition which will permit the movable wall 26 to be moved downwardly by the force of the range spring 89 and upper compression spring 69 and cause the tongues 55 and 56 of the snap blade 50 to snap downwardly over center from the position illustrated in FIG. 2B to the position illustrated in FIG. 2A and thereby cause the snap blade 50 to snap upwardly as illustrated in FIG. 2A.

Thus, it can be seen that the switch construction 10 is adapted to switch the common terminal part 53' between the terminal parts 45' and 46' depending upon the pressure condition in the chamber 30 of the element 24 as determined by the preset force of the compression spring 89 acting on the plate member 42.

Upward movement of the diaphragm member 26 of the power element is limited by the plate member 42 engaging against the end 88 of the tubular member 87 while downward movement of the diaphragm member 26 is limited, in effect, by the shoulder 37 of the fitting 21.

The method of making the switch construction 10 will now be described.

If it is desired to form the switch construction 10 so that the same will have the contact means 54 of the blade 50 open away from the lower fixed contact 44 upon a decrease in pressure in the chamber 30 of the power element 24 and that a certain cut in pressure value and a certain cut out pressure value are to be utilized, the switch housing means 11 is preassembled by itself so that the threaded member 81 extends out of the lower end 77 of the tubular member 78 whereby the housing means 11 is a self-contained unit by itself.

However, the housing means 17 is assembled by first having the power element 24 disposed therein in the position illustrated in FIG. 2 and the plate member 42 is then disposed on top of the same. The range spring 89 is then inserted through the open end 20 of the casing 18 so that the lower end 91 thereof will abut against the plate 42. Thereafter, the adjustment ring 19 is placed down through the open end 20 of the casing 18 until the same abuts against the upper end 90 of the spring 89.

Because the adjustment ring 19 is not fixed in the casing 18, the power element 24 has the movable wall 26 disposed away from the fixed wall 27. Downward force is applied to the adjustment ring 19 forcing the same downwardly and, thus, the compression spring 89, plate 42, diaphragm button 38 and movable wall 26, until the movable wall 26 is spaced a certain distance from the lower stop or shoulder 37 of the fitting 21, such as approximately 0.010 of an inch therefrom. At this time, fluid pressure is directed to the power element 24 through the fitting 21 at the exact value that is desired for having the movable contact 54 initially move away from the lower fixed contact 44 and such cut-out pressure value is maintained in the chamber 30 of the power element 24. At this time, the casing 18 is staked at the side wall thereof to form the previously described staking portions 85 of the casing 18 on each side of the adjustment ring 19 at various positions about the periphery of the casing 18 to hold the adjustment ring 19 at the previously described adjusted position thereof.

The switch housing 11 is then placed into the open end 20 of the casing 18 with the square or rectangular head 82 of the adjusting screw member 81 fitting into the rectangular part 88 of the tubular member 87, the insulating member 72 and the adjustment screw 81 being originally positioned relative to one another so that when the outer annular surface of the end wall 74 of the housing means 11 abuts against the secured adjustment member 19 in the manner illustrated in FIG. 2, the tongues 55 and 56 of the snap blade 50 have been moved upwardly to the position illustrated in FIG. 2B so that the contact 54 of the blade 50 is in contact with the lower fixed contact 44 as illustrated in FIG. 2B.

With the switch housing 11 assembled to the power element housing 17 in the above manner, the desired cut-out pressure for opening the contact 54 away from the lower fixed contact 44 is maintained in the chamber 30 of the power element 24 and the entire switch housing 11 is rotated relative to the lower housing 17 in a direction which will cause the insulating member 72 to rotate relative to the threaded screw 81 as its head 82 is captured by the rectangular part 88 of the tubular member 87 so that the screw 81 cannot rotate with the rotating member 72 whereby the insulated member 72 is threaded onto the screw 81 in an increasing amount and, thus, moves downwardly in FIG. 2 causing the actuators 63 under the force of the compression spring 69 to move downwardly therewith and such movement continues to take place until the switch 16 trips by having the blade 50 snap the contact 54 away from the lower fixed contact 44.

At this time, no further rotation of the housing 11 relative to the housing 17 takes place but the desired cut in pressure is then applied in the chamber 30 of the power element 24 and then the differential screw 47 is turned down to move the upper fixed contact 43 downwardly with the movable contact 54 remaining in contact therewith until the end 51 of the blade 50 has been moved down sufficiently to cause the blade 50 to now snap the movable contact 54 away from the upper contact 43 and into contact with the lower fixed contact 44.

At this time, the housing 17 is stacked to the housing 11 by having upper portions 100 of the casing 18 depressed into cooperating grooves 101 in the housing 11 whereby the housings 11 and 17 are secured together in the desired assembled relation and no further relative rotation of the housings 11 and 17 can take place.

Further, the contact 54 of the switch blade 50 will now always be moved away from the fixed contact 44 whenever the pressure in the chamber 30 of the power element falls below the desired cut-out pressure previously described and will always be moved into contact with the lower contact 44 whenever the pressure in the chamber 30 reaches or exceeds the previously described cut in pressure, the switch construction 10 operating in the manner previously described to cause the blade 50 to snap between the positions illustrated in FIG. 2A and FIG. 2B.

The previously described motion transmitting means 25 and method of making the electrical switch construction is being claimed in a concurrently filed patent application presently designated as Robertshaw Controls Company Docket No. 2341-MIL.

Therefore, it can be seen that this invention not only provides an improved fluid operated diaphragm assembly, but also this invention provides an improved method of making such a diaphragm assembly or the like.

While the form and method of this invention have been described and illustrated as required by the Patent Statute, it is to be understood that other forms and methods can be utilized and still come within the scope of the appended claims.

What is claimed is:

1. A method of making a diaphragm assembly comprising the steps of providing a pair of diaphragm members each having annular inner and outer peripheral portions separated from each other by an annular fluted portion, disposing and securing a ring member between said outer peripheral portions of said diaphragm members whereby a chamber is defined between said diaphragm members inboard of said ring member, forming said diaphragm members each to have a natural tendency to maintain its respective inner and outer peripheral portions coplanar with each other whereby said inner peripheral portions are normally spaced from each other a distance that is approximately the thickness of said ring member, securing a pair of additional ring members to the outer surfaces of said outer peripheral portions of said diaphragm members, forming each ring member to comprise a flat washer-like member that is substantially identical to the other ring members, arranging said ring members so as to be coaxially aligned in said assembly, forming said fluted portion of each diaphragm member to have a single annular flute therein with its concave side facing the concave side of the other diaphragm member and beginning substantially immediately at the coaxially aligned inner peripheral edges of said ring members, and forming said annular flute of each diaphragm member to have an outer peripheral edge joined with the respective outer peripheral portion and an inner peripheral edge joined with the respective inner peripheral portion.

* * * * *